Sept. 6, 1966   J. M. RAKUS   3,270,772
BALL VALVE UNIT
Filed Aug. 23, 1965

INVENTOR
Jozef M. Rakus

By Robert B. Harmor
ATTORNEY

United States Patent Office 3,270,772
Patented Sept. 6, 1966

3,270,772
BALL VALVE UNIT
Jozef M. Rakus, P.O. Box 1749, Washington, D.C.
Filed Aug. 23, 1965, Ser. No. 481,503
9 Claims. (Cl. 137—553)

The present invention relates to valve structures in general, and more particularly to structures of the rotary plug-type wherein the valve plug may be selectively positioned.

An object of the present invention is to provide a valve unit of the rotary plug-type with an indicating means such that the degree of valve opening may be determined between and including a full-open position and a full-closed position.

An additional object of this invention is to provide a valve unit with a resilient sealing means for a valve seating means to establish a cushion for a valve member under stressed conditions.

A further object of the present invention is to provide a valve unit with a hollow spherically shaped valve member being provided with a self-contained lubricating chamber and a plurality of passages thereby establishing a means for constant lubrication within the valve structure without the need for disassembling the components which directly contribute to a valving action.

A still further object of the present invention is to provide a valve unit of the rotating ball variety with an operating means of novel construction.

Figure 1:
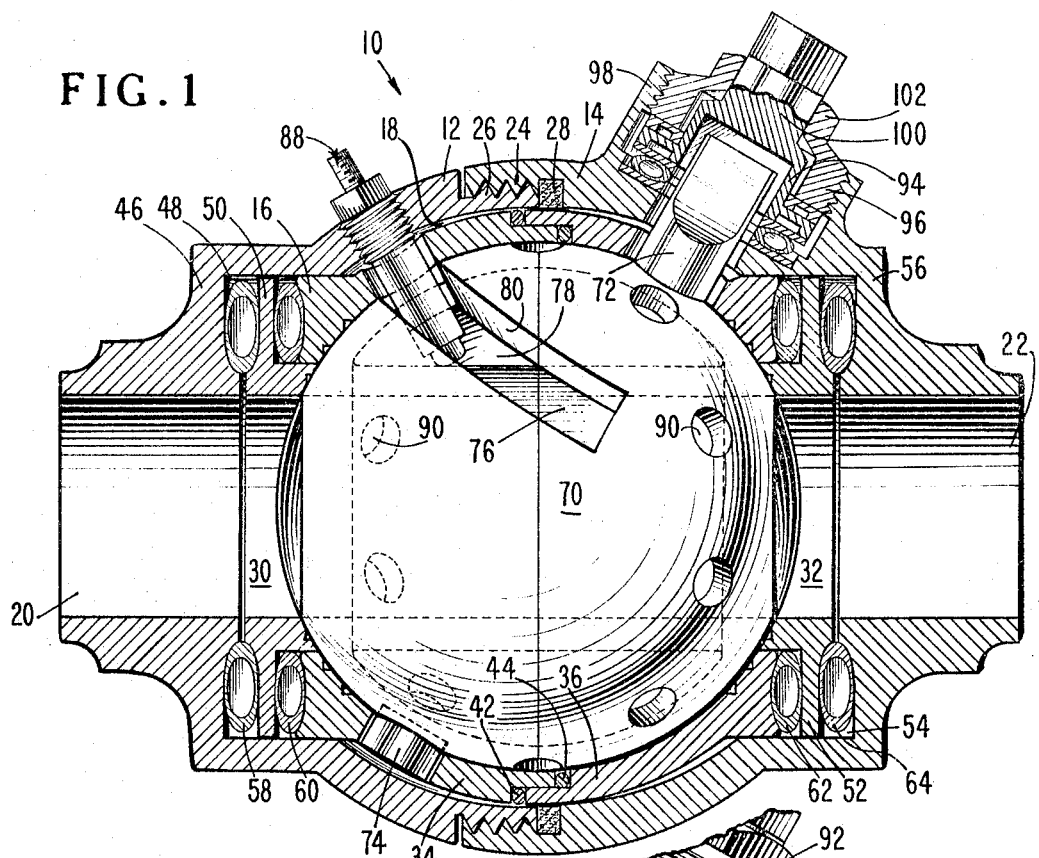
Figure 2:
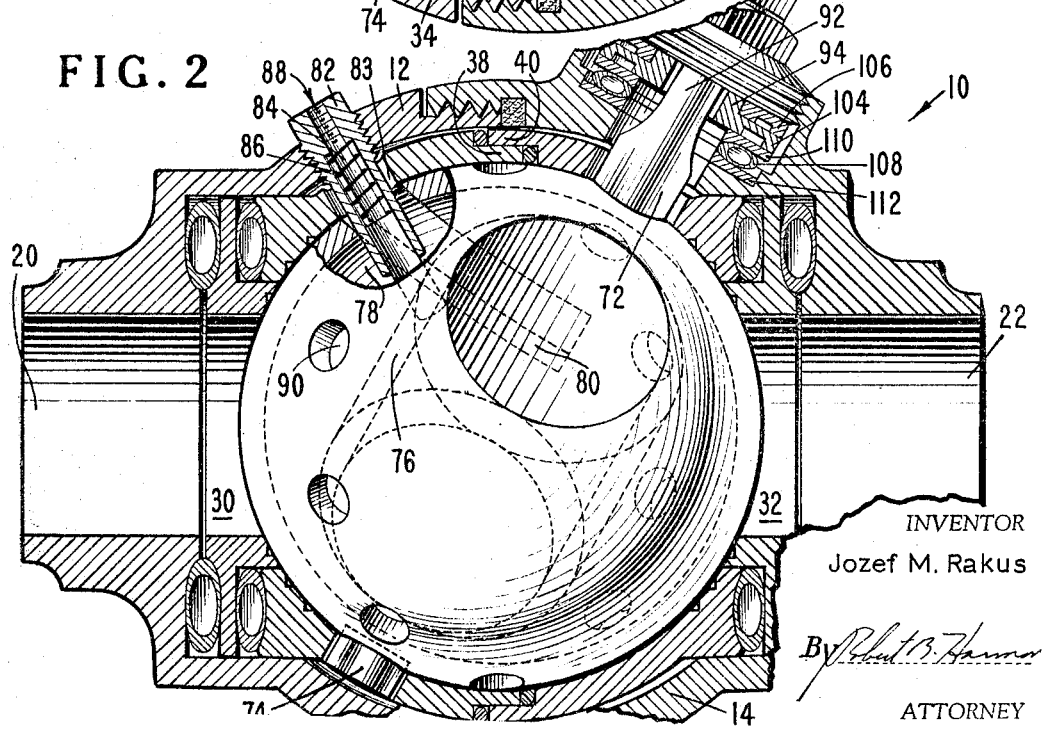

With the foregoing and other objects in view, the invention resides in the following specification and claims, certain embodiments and details of construction being illustrated by the specification when considered with the accompanying drawings in which:

FIGURE 1 is a side elevation illustrating a valve unit within the contemplation of the present invention wherein the valve housing, including a valve seating means and valve sealing means, are illustrated in cross section, and a spherical valve plug positioned therein together with a valve position indicating means are illustrated in perspective in a full-open position; and FIGURE 2 illustrates a fragmentary portion of FIGURE 1 wherein the spherical valve plug and valve position indicating means are illustrated in full-closed position.

Referring more particularly to the drawings, a valve unit, indicated generally by reference number 10, is illustrated in FIGURES 1 and 2. Valve unit 10 is provided with a valve housing which includes exterior walls 12 and 14 and valve seating means, indicated generally by reference numeral 16, all of which define a spherical chamber 18 positioned between an inlet port 20 and an outlet port 22 connected as part of the exterior walls.

Exterior walls 12 and 14, preferably spherically shaped half-sections, may be secured together in any suitable manner. However, as illustrated in FIGURES 1 and 2, and as contemplated as an embodiment of the present invention, the spherically shaped half-sections or exterior walls 12 and 14 may be connected together by interfitting, threaded extensions, such as overlapping extension 24 of section 14 and extension 26 of section 12. An annular sealing means 28 of suitable shape and material may be positioned within an annular groove formed between the end of extension 26 and exterior wall 14.

Valve seating means 16 may consist of seat rings 30 and 32 and valve seats 34 and 36. The seat rings 30 and 32 are positioned adjacent the inlet port 20 and outlet port 22, respectively, and are provided with a size and shape conforming to the size and shape of the ports. The valve seats 34 and 36 are partially hemispherical in shape, conforming generally to the shape of spherical chamber 18. Seats 34 and 36 are positioned within chamber 18 in substantially spaced relationship with the chamber and with each other. Valve seats 34 and 36 may be provided with overlapping connecting extensions 38 and 40, respectively. The extensions are positioned in spaced relationship with the main portion of the seats and in overlapping relationship with each other, such that an annular groove is formed between the end of extension 38 and valve seat 36 and the end of extension 40 and valve seat 34. Annular sealing means 42 and 44 of suitable shape or material may be positioned within the grooves thus formed. Although the sealing means 28, 42 and 44 may be of any suitable material, in a preferred embodiment of the present invention, the material employed consists of a mixture of a predetermined amount of non-corrosive material, such as glass, and a rubber, or rubber-like, substance such as Teflon.

Exterior wall 12 is provided with a deformed portion 46 about the inlet port 20 such that an enlarged space 48 is provided about the inlet port. Seat ring 30 is provided with a radially extending annular flange portion 50 which extends into the space established by deformed portion 46. Seat ring 32 is also provided with a radially extending annular flange portion 52 which extends into a similar space 54 established by a similar deformed portion 56 on exterior wall 14. Valve seats 34 and 36 extend into the spaces 48 and 54, respectively, and abut the deformed portions of the exterior walls along a surface which surrounds the inlet port; however, the valve seats do not contact the flange portions in the preferred form of the invention. Thus, a pair of annular cavities about inlet port 20 and on opposite sides of flange portion 50 are established within the space 48 created by the deformed portion of exterior wall 12. In like manner, a pair of annular cavities are provided about outlet port 22 on opposite sides of flange portion 52 within the space created by the deformed portion of exterior wall 14. Sealing means may be positioned within the annular cavities thus formed.

In a contemplated embodiment of the present invention, the sealing means, positioned within the annular cavities formed in space 48, are preferably hollow ring-shaped, or tubular, members 58 and 60 of a material mixture consisting of a predetermined amount of non-corrosive substance, such as powdered glass and steel and/or a rubber, or rubber-like, material, such as Teflon. Steel alone may be employed as the material for seals 58 and 60 and a coating of non-corrosive material may be employed to impart longer life to the seals. Similar seals 62 and 64 may be provided in the annular cavities formed in the space 54 about outlet port 22.

A spherical valve plug 70 is rotatably positioned within spherical chamber 18 adjacent valve seats 34 and 36 and seat rings 30 and 32. Plug 70 is provided with a turning stem 72 attached to the valve and extending through the seating means and exterior wall of the valve housing. Preferably, stem 72 is attached to plug 70 at an angle with a plane which is mutual to the direction of flow through the valve unit. At a position diametrically opposed to the positon of stem 72 there is provided a rotary stabilizing stud 74 attached to plug 70 and extending within, or through, the valve seating means. Thus, the stem 72 extends through the valve seat 36 and through the exterior wall 14 of valve unit 10 at its top, or upper, side; whereas, the stabilizing stud 74 is rotatably positioned within valve seat 34 at the bottom side of valve unit 10.

Plug 70 is of hollow construction and is provided with a diametrically extending tubular member 76, which is adapted to communicate with the inlet and outlet ports in a first given valve position and to be completely non-communicative with the inlet and outlet ports in a second given valve position, as illustrated in FIGURES 1 and 2, respectively. An annular chamber 78 is thus formed within plug 70 between the tubular member 76 and an inner surface of the plug wall.

Plug 70 is further provided with a slotted portion 80 communicating with the annular chamber 78 and the exterior surface of the plug. Slot 80 is formed at the upper portion of plug 70 and is positioned in a plane mutual with an axis of the sphere extending from stem 72 to stabilizing stud 74.

A hollow shaft 82, of a valve position indicating means, is removably secured to exterior wall 12 of the valve unit. Shaft 82 extends through a passage 83 in valve seat 34 and extends through slot 80 into annular chamber 78 of plug 70. Slot 80 is preferably of such length that one end thereof will contact shaft 82 when tubular member 76 is in the first, or full-open, valve position and such that the opposite end of slot 80 will contact shaft 82 when the tubular member 76 is in the second, or full-closed, valve position thus providing a limit stop at these extreme positions.

A rod, or pin, member 84 is slidably positioned within shaft 82 and is biased such that one end thereof remains in contact with tubular member 76 as the plug 70 is rotated. A suitable biasing means, such a coil spring 86 abutting an enlarged portion of rod 84 at one end of the spring and abutting a reduced portion of the interior of shaft 82 at an opposite end, may be employed. The opposite end of rod member 84, extending beyond the exterior of valve unit 10 and outside the central portion of shaft 82, is provided with suitable scale markings, such as generally indicated at 88, thereby providing a means to indicate the relative degree of valve opening.

Plug 70 may also be provided with a plurality of passages, or holes, 90 extending from annular chamber 78 to the exterior surface of the plug which contact the valve seating means. Preferably, passages 90 are regularly spaced about a circumference of plug 70 in such a manner that they always remain adjacent the valve seating means during the movement of the plug between its full-open position and its full-closed position. Thus, chamber 78 may be employed as a reservoir for a valve lubricant. An oil, or grease, may be fed into the chamber in any suitable manner by removing the valve position indicating means, i.e. shaft 82 and rod 84 of the embodiment illustrated, and injecting the lubricant through the resulting passage in the exterior wall and the valve seating means of the valve housing and through the slot 80 in plug 70 to chamber 78. Thus, the valve unit may be provided at all times with a self-contained lubricant which passes from chamber 78 through passages 90 to the exterior surface of plug 70 and to the plug contacting surfaces of the valve seating means. Thorough and continuous lubrication between the contacting surfaces of the valve plug and the valve housing is thereby provided.

Seals 28, 42, 44, 58, 60, 62 and 64 serve, in part, to maintain the self-contained lubricant of plug 70 within the spherical chamber of valve unit 10. A special construction may be provided over the valve stem 72 to prevent the lubricant from passing to the exterior of the valve unit through the valve stem opening. In a preferred embodiment of the present invention, valve stem 72 is tapered at its upper, or exterior, end 92. A cap 94, preferably rectangular in shape, as shown, allowing it to form a substantial clearance over the tapered end of stem 72, is positioned on end 92 of stem 72 and is held thereon by means of an externally threaded bushing 96 which is secured in an internally threaded cylindrical extension 98 of exterior wall 14. The walls of cylindrical extension 98 extend outside the valve unit in a direction perpendicular to the surface of exterior wall 14. Cap 94 extends through and is rotatably positioned within a tubular passage created by an outwardly protruding cylindrical extension 102 on bushing 96. Thus, shaft 100 and cap 94 may be employed to turn valve stem 72 to rotate valve plug 70.

A flange 104 extending in a direction mutual to the side walls of cap 94 may be provided at the lower end of the cap. A sealing washer 106 may be provided between an upper surface of flange 104 and a bottom end of the bushing 96. Additionally, a sealing construction comprised of a tubular annular ring 108, similar in construction to the tubular sealing rings 58 and 60, sandwiched between two accommodation washers 110 and 112, may be provided between a lower surface of flange 104 and a portion of the exterior wall 14 extending within the area defined by cylindrical extension 98. The surface of sealing washer 106 which contacts flange 104, and the lower surface of flange 104 may be provided with annular grooves into which a lubricant may be inserted thereby decreasing the friction created when shaft 100 is rotated to turn valve stem 72.

Seals 58, 62 and 64 may also serve as springs to cushion the seating means and plug within the valve housing under conditions of stress created by the substance flowing through, or blocked by, the valve unit. Seals 58, 60, 62 and 64 may be tubular in construction and elliptical in shape and may be formed of a metallic material, such as stainless steel, or they may be made of a resilient material, such as a rubber or rubber-like material, being provided with a sufficient stiffness and hardness and being crack free under conditions of expansion and compression. Air trapped in the tubular seals will allow them to store energy under conditions which cause them to compress. Upon release of the conditions creating stress, the stored energy will cause the tubular seals to spring back to their original non-stressed state.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A valve unit comprising a housing, said housing being provided with an exterior wall and a spherical chamber disposed between an inlet port and an outlet port, a spherically shaped hollow valve member rotatably positioned within the spherical chamber of said housing, a rotating means attached to said valve member and extending through said housing, a tubular member extending diametrically through said hollow valve member and communicating with the inlet and outlet ports when said valve member is rotated to a first position and blocking the inlet and outlet ports when said valve member is rotated to a second position, said tubular member and said hollow valve member forming an annular chamber within the interior of said valve member, and a valve position indicating means attached to said housing and contacting said tubular member establishing a means to display the relative degree of valve opening between the first position and the second position.

2. A valve unit according to claim 1 wherein said valve member is provided with a slot through which said indicating means extends to contact said tubular member.

3. A valve unit according to claim 2 wherein said indicating means comprises a hollow casing positioned through and removably attached to said housing, and a rod member slidably positioned within said casing, a first end of said rod member being biased against said tubular member, and a second end of said rod member being provided with scaled markings and extending beyond the exterior of said housing.

4. A valve unit according to claim 1 wherein said hollow valve member is provided with a plurality of passages extending from the exterior of said valve member to the annular space within said valve member.

5. A valve unit according to claim 4 wherein said plurality of passages are regularly spaced about a circumference of said spherical valve member.

6. A valve unit according to claim 1 wherein said housing is provided with valve seating means, said seating means being positioned within the spherical chamber adjacent an interior surface of said exterior wall of said housing and adjacent said valve member.

7. A valve unit according to claim 6 wherein said valve seating means comprises a pair of ring members, a pair of partially hemispherical hollow sections, and annular sealing means, said ring members being provided with a passage conforming to the inlet and outlet ports, a first of said ring members being positioned at the inlet port between said valve member and an interior surface of the exterior wall of said housing, a second of said ring members being positioned at the outlet port between said valve member and an interior surface of the exterior wall of said housing, each said ring member being provided with radially extending annular flange portions, said flange portions and said exterior wall defining a first annular cavity about the inlet port and a second annular cavity about the outlet port, said pair of partially hemispherical sections being positioned between said valve member, an interior surface of said exterior wall and said flange portions of said ring members, said ring members, said flange portions thereof, said exterior wall and said partially hemispherical sections defining a third annular cavity about the inlet port and a fourth annular cavity about the outlet port, said sealing means being positioned within each of said annular cavities and between said partially hemispherical sections.

8. A valve unit according to claim 7 wherein said sealing means in said annular cavities comprises ring-shaped tubular members establishing a resilient cushion for said seating means.

9. A valve unit according to claim 1 wherein said rotating means comprises a shaft attached to said valve member, a cap extension positioned on said shaft, a means to secure said cap extension to said housing, and a sealing means positioned about said shaft and adjacent said housing.

References Cited by the Examiner

UNITED STATES PATENTS 2,605,993  8/1952  Bowan et al. _____ 137—246.11
2,979,071  4/1961  Herring et al. _____ 137—246.13

FOREIGN PATENTS 687,567  5/1964  Canada.
127,778  3/1950  Sweden.
308,349  9/1955  Switzerland.

M. CARY NELSON, *Primary Examiner.*

HENRY T. KLINKSIEK, *Assistant Examiner.*